United States Patent
Schenk et al.

(10) Patent No.: US 12,295,006 B2
(45) Date of Patent: May 6, 2025

(54) CONTROL SIGNALING FOR SIC IN NR 2-CODEWORD OPERATING MODE

(71) Applicant: QUALCOMM Incorporated, San Diego, CA (US)

(72) Inventors: Andreas Maximilian Schenk, Erlangen (DE); Hari Sankar, San Diego, CA (US); Jae Won Yoo, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/809,269

(22) Filed: Jun. 27, 2022

(65) Prior Publication Data

US 2023/0422255 A1    Dec. 28, 2023

(51) Int. Cl.
*H04W 8/22* (2009.01)
*H04L 1/14* (2006.01)
*H04L 1/1607* (2023.01)
*H04W 72/23* (2023.01)
*H04W 72/542* (2023.01)

(52) U.S. Cl.
CPC ......... *H04W 72/23* (2023.01); *H04L 1/1607* (2013.01); *H04W 72/542* (2023.01)

(58) Field of Classification Search
None
See application file for complete search history.

(56) References Cited

U.S. PATENT DOCUMENTS

| | | | | |
|---|---|---|---|---|
| 8,694,851 B1* | 4/2014 | Sun | ................... | H03M 13/6331 714/758 |
| 8,769,352 B1* | 7/2014 | Sun | ................... | H04L 25/03305 714/704 |
| 11,363,451 B2* | 6/2022 | Dou | ...................... | H04L 5/0053 |
| 2008/0013610 A1* | 1/2008 | Varadarajan | .......... | H04L 1/0618 375/221 |

(Continued)

OTHER PUBLICATIONS

International Search Report and Written Opinion—PCT/US2023/025195—ISA/EPO—Oct. 4, 2023.

(Continued)

*Primary Examiner* — Duc T Duong
(74) *Attorney, Agent, or Firm* — Procopio, Cory, Hargreaves & Savitch

(57) ABSTRACT

Method and apparatus for control signaling for SIC operation in 2-codeword operating mode. The apparatus transmits, to a network entity, a SIC capability indication comprising an indication that the UE supports a SIC operation for 2-CW allocation and an order of processing a first codeword and a second codeword. The apparatus monitors for an ACK to enable the SIC operation between the UE and the network entity. The apparatus receives downlink communication based on the SIC operation in response to receiving the ACK to enable the SIC operation. The apparatus may process the first codeword, within the downlink communication, transmitted based on a first MCS. The apparatus may cancel interference from the downlink communication based on the first codeword to obtain the second codeword, within the downlink communication, transmitted based on a second MCS.

26 Claims, 11 Drawing Sheets

(56) References Cited

U.S. PATENT DOCUMENTS

| | | | | |
|---|---|---|---|---|
| 2010/0027697 A1* | 2/2010 | Malladi | ............... | H04L 1/0656 |
| | | | | 375/295 |
| 2010/0087221 A1* | 4/2010 | Srinivasan | ............ | H04W 16/08 |
| | | | | 455/63.1 |
| 2010/0177653 A1* | 7/2010 | Luo | ................... | H04L 25/03305 |
| | | | | 370/252 |
| 2010/0271988 A1* | 10/2010 | Jia | ..................... | H04L 25/03331 |
| | | | | 375/345 |
| 2010/0284454 A1* | 11/2010 | Oteri | ................ | H03M 13/353 |
| | | | | 375/224 |
| 2011/0075753 A1* | 3/2011 | Jung | .................... | H04L 1/0017 |
| | | | | 375/267 |
| 2012/0069757 A1* | 3/2012 | Jiang | .................... | H04J 11/0033 |
| | | | | 370/252 |
| 2014/0301509 A1* | 10/2014 | Xu | ....................... | H04L 1/0026 |
| | | | | 375/346 |
| 2015/0043540 A1* | 2/2015 | Nikopour | .............. | H04W 72/51 |
| | | | | 370/335 |
| 2016/0309542 A1* | 10/2016 | Kowalski | ............. | H04W 72/23 |
| 2018/0026743 A1* | 1/2018 | Zhang | .................... | H04J 99/00 |
| | | | | 370/329 |
| 2018/0254814 A1* | 9/2018 | Park | ..................... | H04B 7/0626 |
| 2022/0352915 A1* | 11/2022 | Abedini | ................ | H01Q 21/06 |
| 2023/0308886 A1* | 9/2023 | Jeon | ................... | H04W 74/002 |
| 2023/0413187 A1* | 12/2023 | Hassan | ............... | H04W 52/241 |

OTHER PUBLICATIONS

Motorola: "Further Results on Layer Shifting Issue in UL-MIMO and Simulation Alignment Discussion", 3GPP TSG RAN1#58bis, R1-093965, 3rd Generation Partnership Project, Mobile Competence Centre, 650, Route Des Lucioles, F-06921 Sophia-Antipolis Cedex, France, No. Miyazaki, Oct. 12, 2009-Oct. 15, 2009, Oct. 12, 2009, 12 Pages, XP050388459, section 3.

Orange: "Physical layer abstraction for turbo-CWIC receivers", 3GPP TSG-RAN WG1 meeting #74bis, R1-134799, 3rd Generation Partnership Project, Mobile Competence Centre, 650, Route Des Lucioles, F-06921 Sophia-Antipolis Cedex, France vol. RAN WG1, No. Guangzhou, China, Oct. 7, 2013-Oct. 11, 2013, Sep. 30, 2013, 14 Pages, XP050717849, section 5.2.

* cited by examiner

CONTROL SIGNALING FOR SIC IN NR 2-CODEWORD OPERATING MODE

TECHNICAL FIELD

The present disclosure relates generally to communication systems, and more particularly, to a configuration for control signaling for successive interference cancellation (SIC) in 2-codeword operating mode.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus transmits, to a network entity, a successive interference cancellation (SIC) capability indication comprising an indication that the UE supports a SIC operation and an order of processing a first codeword and a second codeword. The apparatus monitors for an acknowledgement (ACK) to enable the SIC operation between the UE and the network entity. The apparatus receives downlink communication based on the SIC operation in response to receiving the ACK to enable the SIC operation.

In an aspect of the disclosure, a method, a computer-readable medium, and an apparatus are provided. The apparatus may be a device at a network node. The device may be a processor and/or a modem at a network node or the network node itself. The apparatus obtains a successive interference cancellation (SIC) capability indication comprising an indication that a user equipment (UE) supports a SIC operation and an order of processing a first codeword and a second codeword. The apparatus outputs an acknowledgement (ACK) to enable the SIC operation between the UE and the network entity. The apparatus outputs downlink communication based on the SIC operation in response to the outputting the ACK to enable the SIC operation.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
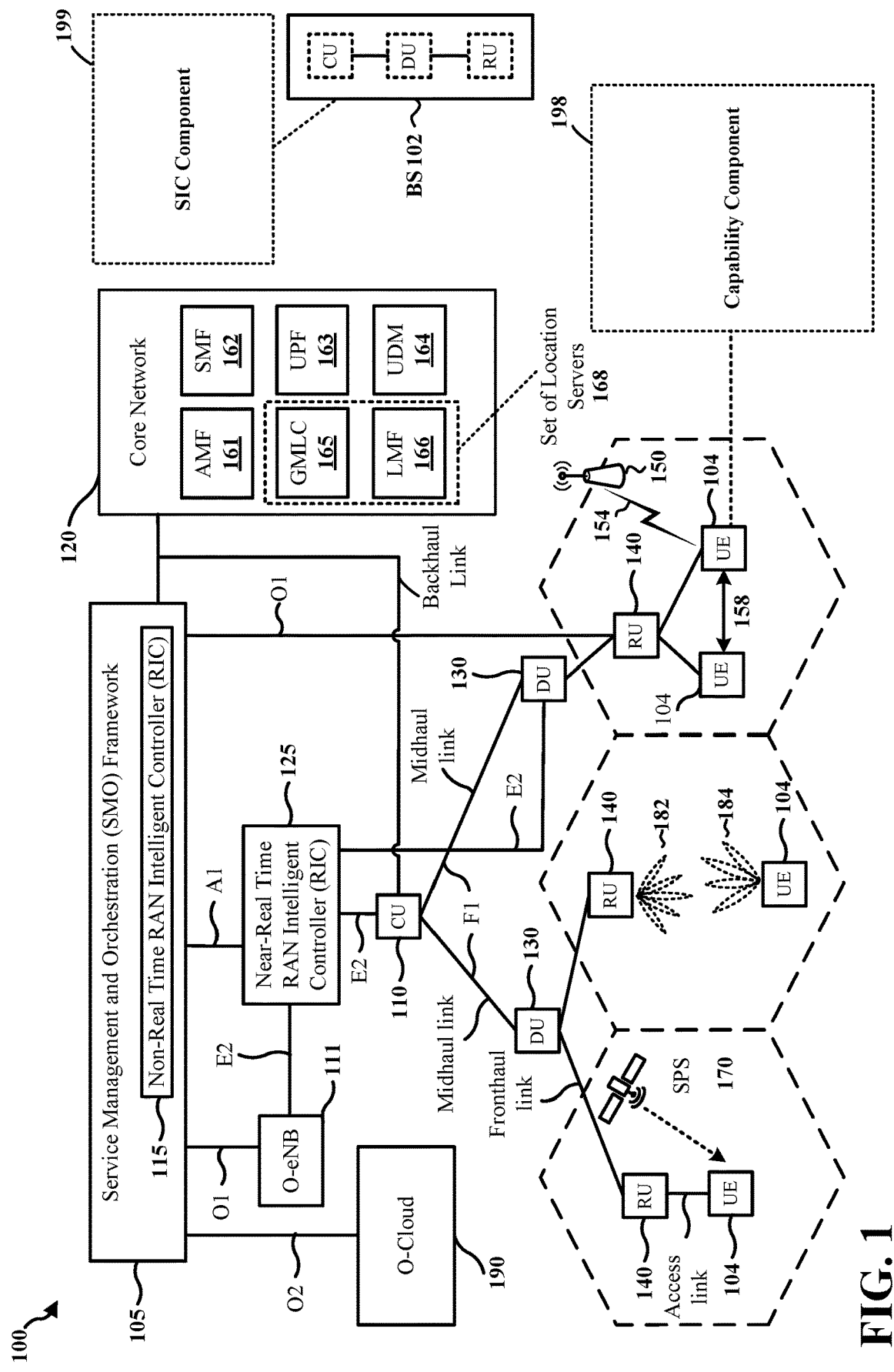
FIG. 1 is a diagram illustrating an example of a wireless communications system and an access network.

In wireless communications, downlink communication may be configured to transmit two codewords (CW). For example, in 5G NR in instances of more than 4-layer and up to 8-layer PDSCH allocation, there are 2 codewords (CW)

per transmit time interval. For example, customer premise equipment (CPE) products may be configured with 8-layer support, while UEs only support 4 layers. With 2 CWs, the receiver performance may be enhanced with SIC across CWs. After successful decoding of a first CW, cancellation of the interference from the first CW can be performed to enhance demodulation and decoding for the second CW. Efficiency of SIC for 2 CWs may be enhanced by joint parameter optimization of the base station and the UE.

Aspects presented herein provide a configuration for control signaling for SIC operation in two CW operating mode. The aspects presented herein may allow a UE to indicate to a base station that SIC operation is supported at the UE, which may allow for enhanced SIC operation between the base station and the UE. For example, the UE may indicate to the base station that SIC in 2-CW operation mode is supported at the UE, as well as provide the order of processing of the two CWs. The signaling may comprise a dedicated UE capability or any other appropriate control signal.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a capability component 198 configured to transmit, to a network entity, a successive interference cancellation (SIC) capability indication comprising an indication that the UE supports a SIC operation for 2-CW allocation and an order of processing a first codeword and a second codeword; monitor for an ACK to enable the SIC operation between the UE and the network entity; and receiving downlink communication based on the SIC operation in response to receiving the ACK to enable the SIC operation.

Referring again to FIG. 1, in certain aspects, the base station 102 may include a SIC component 199 configured to obtain a SIC capability indication comprising an indication that a UE supports a SIC operation for 2-CW allocation and an order of processing a first codeword and a second codeword; output an ACK to enable the SIC operation between the UE and the network entity; and output downlink communication based on the SIC operation in response to the outputting the ACK to enable the SIC operation.

Although the following description may be focused on 5G NR, the concepts described herein may be applicable to other similar areas, such as LTE, LTE-A, CDMA, GSM, and other wireless technologies.

Figure 2:
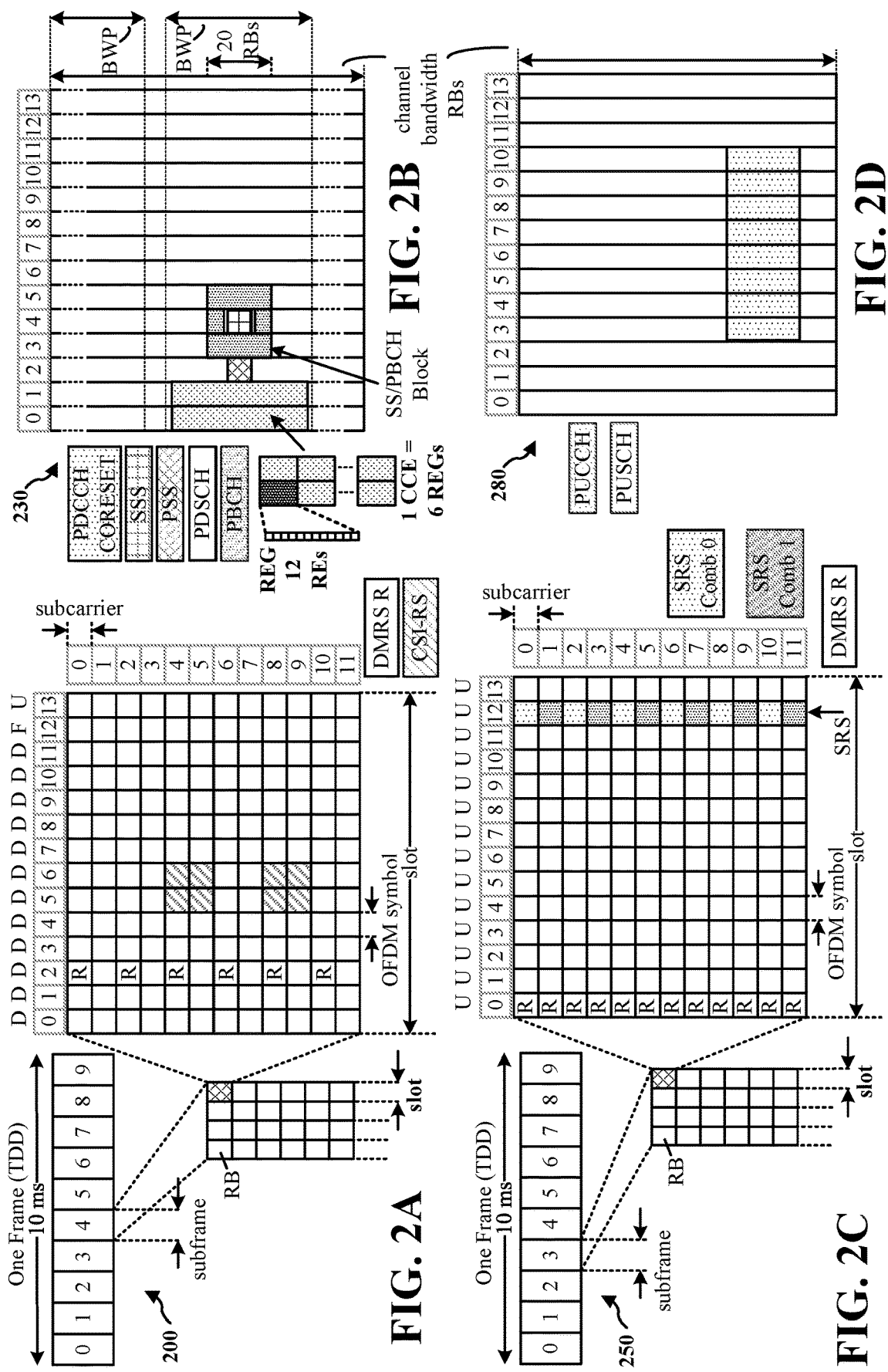
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
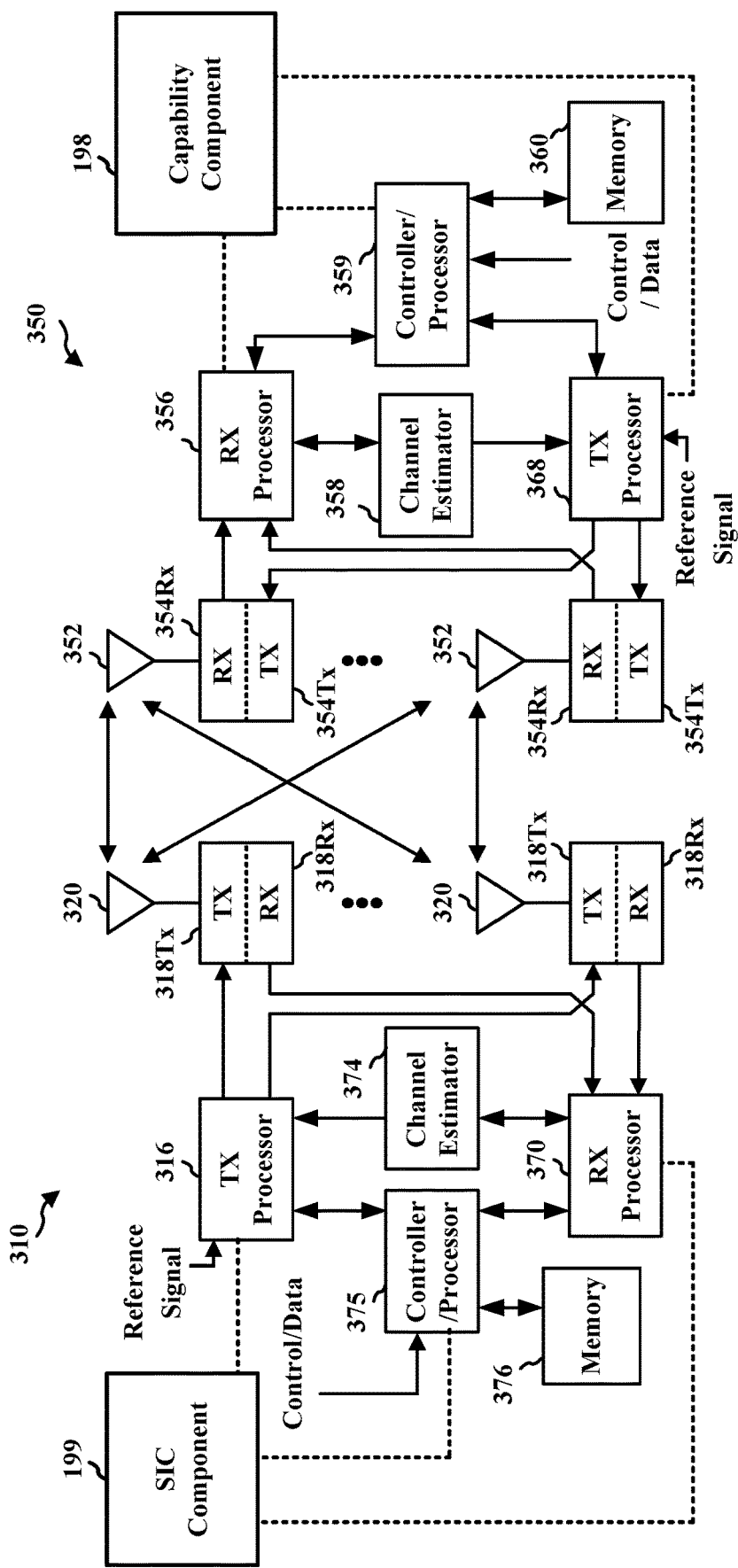
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the capability component 198 of FIG. 1.

At least one of the TX processor 316, the RX processor 370, and the controller/processor 375 may be configured to perform aspects in connection with the SIC component 199 of FIG. 1.

In wireless communications, downlink communication may be configured to transmit two codewords (CW). For example, in 5G NR in instances of more than 4-layer and up to 8-layer PDSCH allocation, there are 2 codewords (CW) per transmit time interval. For example, customer premise equipment (CPE) products may be configured with 8-layer support, while UEs only support 4 layers. With 2 CWs, the receiver performance may be enhanced with SIC across CWs. After successful decoding of a first CW, cancellation of the interference from the first CW can be performed to enhance demodulation and decoding for the second CW. Efficiency of SIC for 2 CWs may be enhanced by joint parameter optimization of the base station and the UE.

Figure 4:
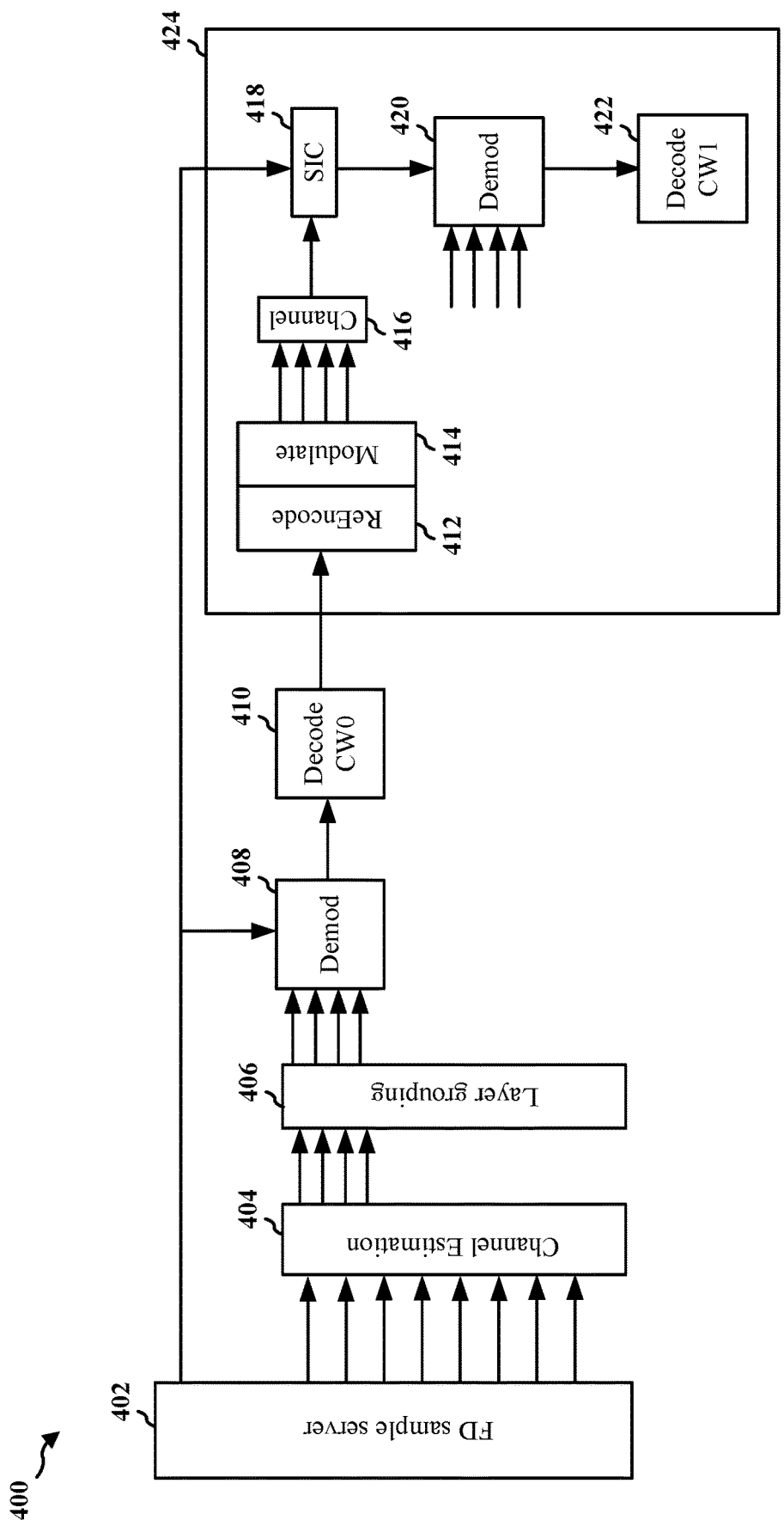
FIG. 4 is a diagram illustrating an example of a SIC operation.

FIG. 4 is a diagram 400 illustrating an example of a SIC operation. A SIC operation may include demodulating and decoding of a first CW of the two CWs, and if properly decoded, then subtract the re-encoded and re-modulated signal of the first CW before demodulation and decoding of the second CW. For example, as shown in the diagram 400 of FIG. 4, the frequency domain (FD) sample server 402 may provide data for transmission comprised of 8 layers to a channel estimation 404. The channel estimation 404 may provide up to 8 layers to layer grouping 406 to determine the layers required to demodulate and decode the CW. The data is provided to demodulator 408 which provides the demodulated data to a decoder 410. The decoder 410 decodes the data associated with the first codeword (e.g., CW0). The decoder 410 may receive input from the FD sample server 402 which may be included in the data associated with the first codeword. The data is transmitted to the UE 424 to perform the SIC operation. The UE 424 may process the signal by reencoding the data at reencode 412 and modulating the reencoded data at modulate 414. The estimated channel may be re-applied to the associated layers of the modulated data of the first codeword at channel 416, such that the channel is subtracted from the receive signal at SIC 418. The output of SIC 418 has the interference associated with the first codeword (e.g., CW0) cancelled out. The output of SIC 418 may then be demodulated at demod 420 and decoded at decode 422 to derive the second codeword (e.g., CW1).

Aspects presented herein provide a configuration for control signaling for SIC operation in two CW operating mode. The aspects presented herein may allow a UE to indicate to a base station that SIC operation is supported at the UE, which may allow for enhanced SIC operation between the base station and the UE. At least one advantage of the disclosure is that a relative throughput gain may be achieved over non-SIC operation for instances where the base station optimizes the outer-loop link adaptation (OLLA) target block-error rate (BLER) per CW. At least another advantage of the disclosure is that dedicated control or capability signaling between the UE and base station may be utilized to enhance SIC operation in 2-CW PDSCH mode. For example, the UE may indicate to the base station that SIC in 2-CW operation mode is supported at the UE, as well as provide the order of processing of the two CWs. The signaling may comprise a dedicated UE capability or any other appropriate control signal.

With SIC operation at the UE, demodulation of the second CW may be more reliable than the first CW or non-SIC operation, as such, a greater MCS or code rate may be utilized for the second CW and/or the PDSCH transmission may sustain a larger number of total layers (e.g., sum of layers of the two CWs). To assist successful SIC operation at the UE, the demodulation and decoding of the first CW may be more robust in comparison to the second CW or non-SIC operation, which may be achieved by utilizing a lower MCS or code rate.

If the base station is aware of SIC operation at the UE, as well as the order of decoding of the two CWs, then the base station may use different BLER targets for each CW for an OLLA algorithm. For example, the MCS of each CW driven by a state of the art link adaptation algorithm on the base station side may be based on ACK/NACK feedback provided by the UE for each CW. Optimization of further PDSCH characteristics to enhance SIC operation at the UE may further comprise transmission precoding to favor the first-processed CW of the two CWs.

Figure 5:
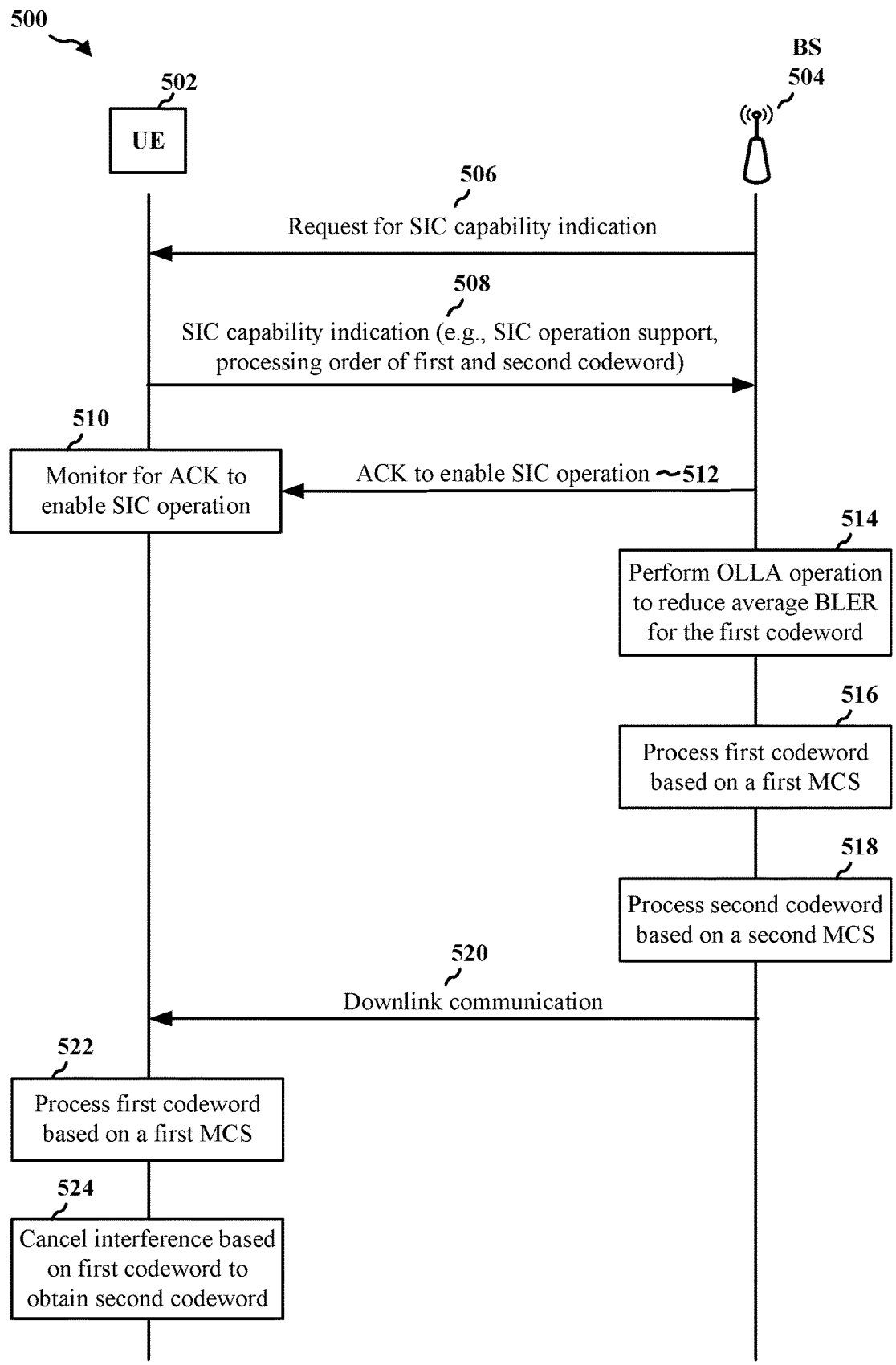
FIG. 5 is a call flow diagram of signaling between a UE and a base station.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102 and. Further, a UE 502 may correspond to at least UE 104. In another example, in the context of FIG. 3, the base station 504 may correspond to base station 310 and the UE 502 may correspond to UE 350.

At 506, the base station 504 may output a request for the SIC capability indication. The network entity may output a request for the SIC capability indication to the UE 502. The UE 502 may receive the request to transmit the SIC capability indication from the base station 504.

At 508, the UE 502 may transmit the SIC capability indication. The UE 502 may transmit the SIC capability indication to the base station 504. The base station 504 may receive the SIC capability indication from the UE 502. In some aspects, the UE may transmit the SIC capability indication in response to receiving the request to transmit the SIC capability indication from the base station 504. In some aspects, the UE may transmit the SIC capability indication on its own. For example, upon establishing a connection with the base station 504. The SIC capability indication may comprise an indication that the UE supports a SIC operation for 2-CW allocation and an order of processing a first codeword and a second codeword. In some aspects, the SIC capability indication may be comprised within PUCCH, PUSCH, or RRC signaling.

At 510, the UE 502 may monitor for an ACK to enable the SIC operation. The UE may monitor for the ACK from the base station 504 to enable the SIC operation, in response to transmitting the SIC capability indication to the base station 504. The SIC operation being between the UE and the network entity. In some aspects, the SIC operation is not enabled in response to receiving a NACK. In some aspects, the SIC operation is not enabled in response to failing to receive an ACK or a NACK in response to the transmitting of the SIC capability indication.

At 512, the base station 504 may output an ACK to enable the SIC operation. The base station 504 may output the ACK to the UE 502 to enable the SIC operation. The UE 502 may receive the ACK from the base station 504. The SIC operation may be between the UE and the base station. In some aspects, the SIC operation is not enabled in response to receiving a NACK instead of the ACK. In some aspects, the SIC operation is not enabled in response to failing to receive an ACK or a NACK, at the UE, in response to the transmitting of the SIC capability indication to the base station.

At 514, the base station 508 may perform an OLLA operation. The base station may perform the OLLA operation to reduce an average block-error rate (BLER) for the first codeword of the downlink communication in comparison to the second codeword of the downlink communication. In some aspects, reducing the average BLER for the first codeword may comprise at least one of lowering the MCS of the first codeword, decreasing an amount of transmitted parallel data streams of the first codeword, or adjusting a transmit beamforming or precoding for the downlink communication. In some aspects, one or more parameters of the OLLA operation may be adjusted such that the average BLER of the first codeword is less than the BLER of the second codeword.

At 516, the base station 508 may process the first codeword in preparation to output the downlink communication based on the SIC operation. The base station may process the first codeword based on a first MCS.

At 518, the base station 508 may process the second codeword in preparation to output the downlink communication based on the SIC operation. The base station may process the second codeword based on a second MCS. The first codeword and the second codeword are comprised within the downlink communication. In some aspects, the order of processing the first codeword and the second codeword may comprise that the first codeword is processed before the second codeword. In some aspects, the order of processing the first codeword and the second codeword may comprise that the second codeword is processed before the first codeword.

At 520, the base station 508 may output downlink communication based on the SIC operation to the UE 502. The UE 502 may receive the downlink communication from the base station 508. The base station may output the downlink communication based on the SIC operation in response to outputting the ACK to enable the SIC operation.

At 522, the UE 502 may process the first codeword transmitted within the downlink communication. The UE may process the first codeword transmitted based on a first MCS.

At 524, the UE 502 may cancel interference from the downlink communication. The UE may cancel the interference from the downlink communication based on the first codeword to obtain the second codeword, within the downlink communication, transmitted based on a second MCS. In some aspects, the order of processing the two codewords may follow the order as signaled in the SIC capability.

Figure 6:
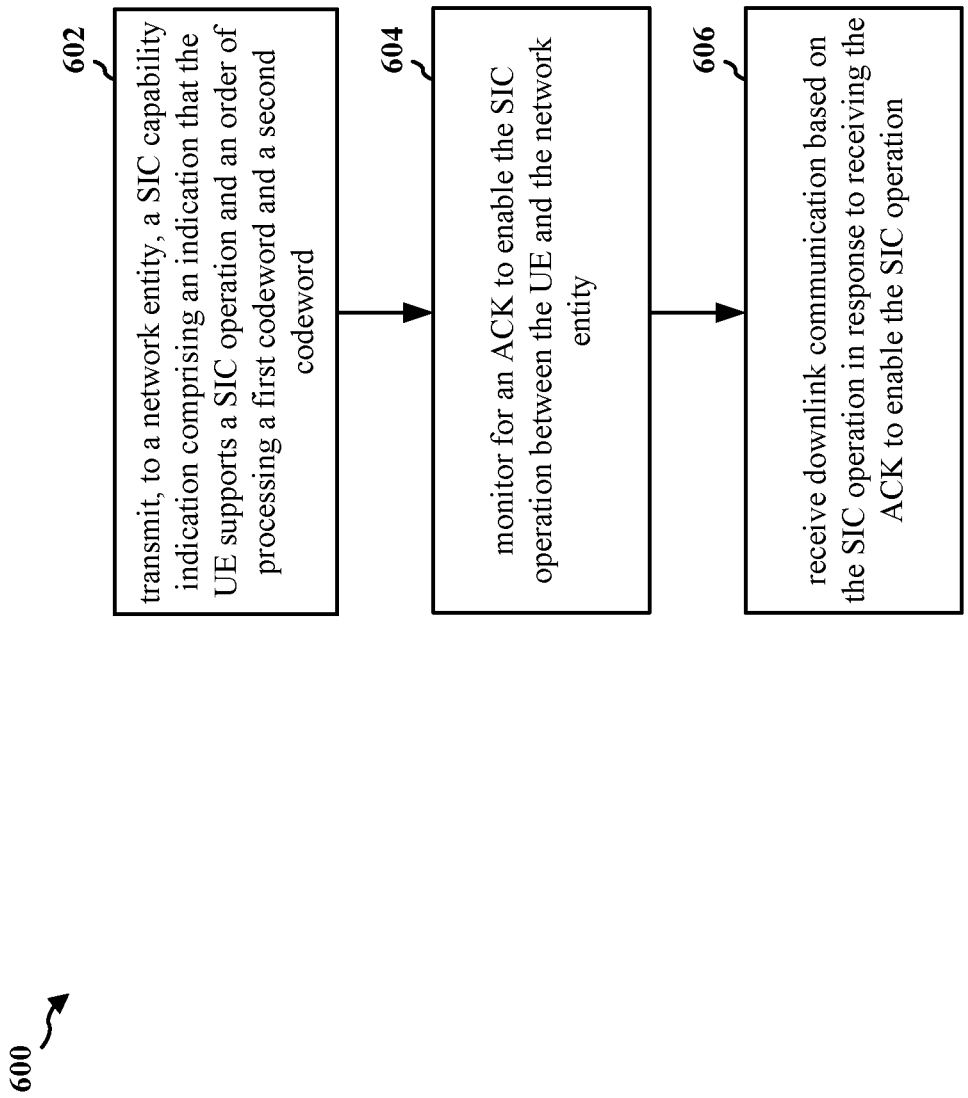
FIG. 6 is a flowchart of a method of wireless communication.

FIG. 6 is a flowchart 600 of a method of wireless communication. The method may be performed by a UE (e.g., the UE 104; the apparatus 804). One or more of the illustrated operations may be omitted, transposed, or contemporaneous. The method may allow a UE to indicate that SIC is supported at the UE.

At 602, the UE may transmit a SIC capability indication. For example, 602 may be performed by capability component 198 of apparatus 804. The UE may transmit the SIC capability indication to a network entity. The SIC capability indication may comprise an indication that the UE supports a SIC operation for 2-CW allocation and an order of processing a first codeword and a second codeword. In some aspects, the SIC capability indication is comprised within PUCCH, PUSCH, or RRC signaling.

At 604, the UE may monitor for an ACK to enable the SIC operation. For example, 604 may be performed by capability component 198 of apparatus 804. The UE may monitor for the ACK from the network entity to enable the SIC operation. The SIC operation being between the UE and the network entity. In some aspects, the SIC operation is not enabled in response to receiving a non-acknowledgement (NACK). In some aspects, the SIC operation is not enabled in response to failing to receive an ACK or a NACK in response to the transmitting of the SIC capability indication.

At 606, the UE may receive downlink communication based on the SIC operation. For example, 606 may be performed by capability component 198 of apparatus 804. The UE may receive the downlink communication based on the SIC operation from the network entity. The UE may receive the downlink communication based on the SIC operation in response to receiving the ACK to enable the SIC operation.

Figure 7:
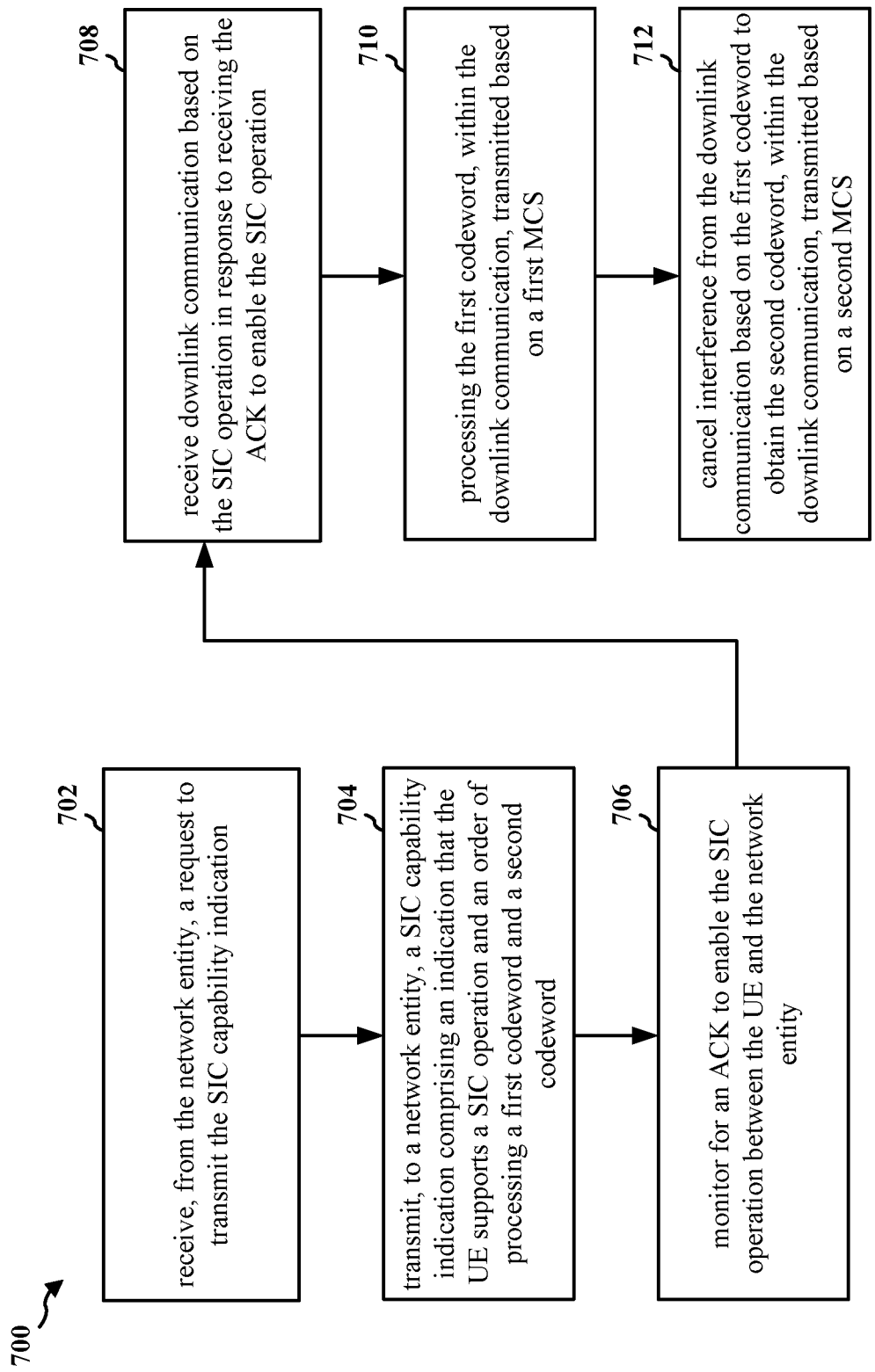
FIG. 7 is a flowchart of a method of wireless communication.

FIG. 7 is a flowchart 700 of a method of wireless communication. The method may be performed by a UE (e.g., the UE 104; the apparatus 804). One or more of the illustrated operations may be omitted, transposed, or contemporaneous. The method may allow a UE to indicate that SIC is supported at the UE.

At 702, the UE may receive a request to transmit a SIC capability indication. For example, 702 may be performed by capability component 198 of apparatus 804. The UE may receive the request to transmit the SIC capability indication from a network entity.

At 704, the UE may transmit a SIC capability indication. For example, 704 may be performed by capability component 198 of apparatus 804. The UE may transmit the SIC capability indication to a network entity. The SIC capability indication may comprise an indication that the UE supports a SIC operation for 2-CW allocation and an order of processing a first codeword and a second codeword. In some aspects, the SIC capability indication is comprised within PUCCH, PUSCH, or RRC signaling.

At 706, the UE may monitor for an ACK to enable the SIC operation. For example, 706 may be performed by capability component 198 of apparatus 804. The UE may monitor for the ACK from the network entity to enable the SIC operation. The SIC operation being between the UE and the network entity. In some aspects, the SIC operation is not enabled in response to receiving a NACK. In some aspects, the SIC operation is not enabled in response to failing to receive an ACK or a NACK in response to the transmitting of the SIC capability indication.

At 708, the UE may receive downlink communication based on the SIC operation. For example, 708 may be performed by capability component 198 of apparatus 804. The UE may receive the downlink communication based on the SIC operation from the network entity. The UE may receive the downlink communication based on the SIC operation in response to receiving the ACK to enable the SIC operation.

At 710, the UE, to receive the downlink communication based on the SIC operation, may process the first codeword transmitted. For example, 710 may be performed by capability component 198 of apparatus 804. The UE may process the first codeword, within the downlink communication, transmitted based on a first MCS.

At 712, the UE, to receive the downlink communication based on the SIC operation, may cancel interference from the downlink communication. For example, 712 may be performed by capability component 198 of apparatus 804. The UE may cancel the interference from the downlink communication based on the first codeword to obtain the second codeword, within the downlink communication, transmitted based on a second MCS. In some aspects, the order of processing the two codewords may follow the order as signaled in the SIC capability.

Figure 8:
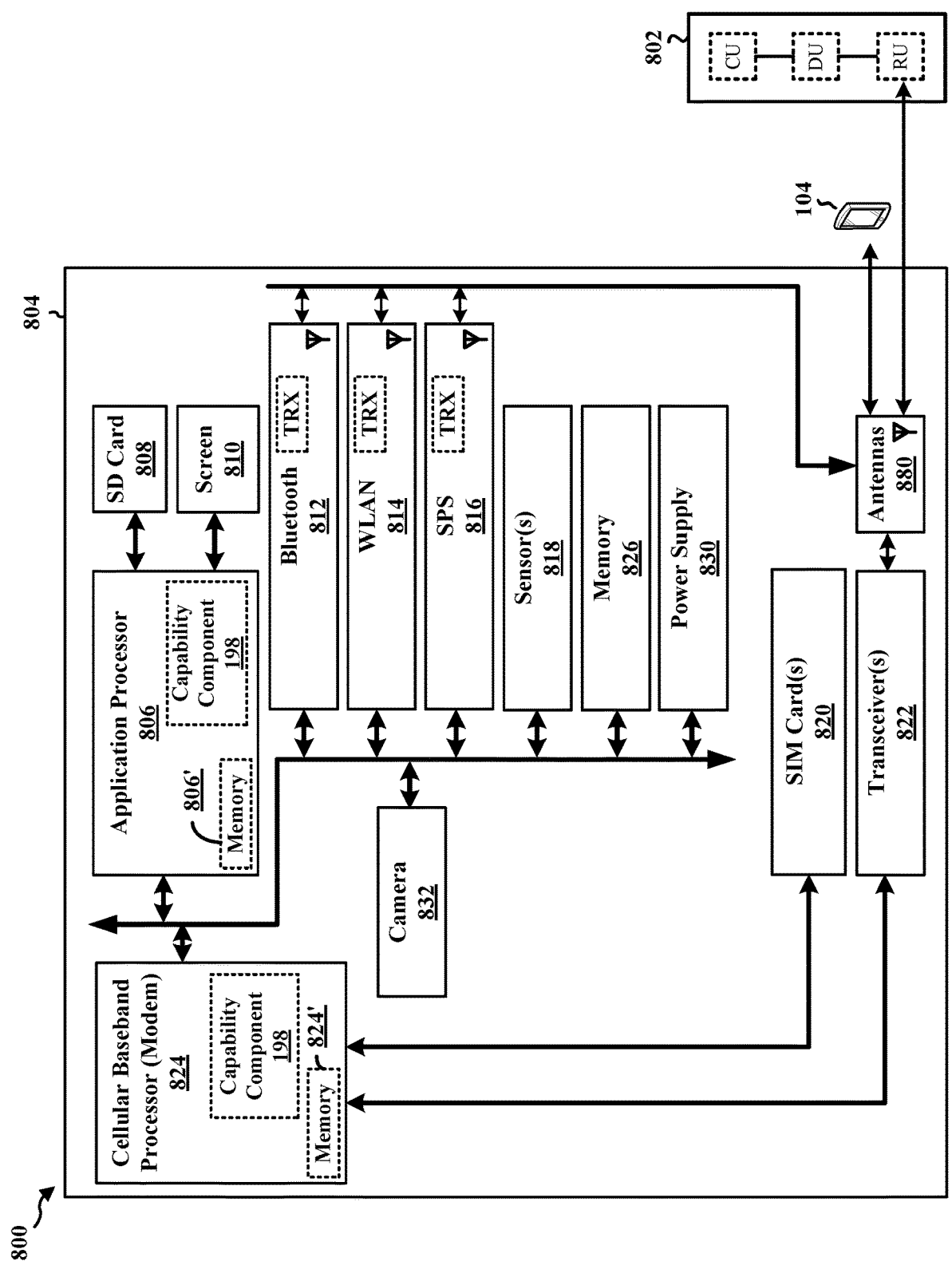
FIG. 8 is a diagram illustrating an example of a hardware implementation for an example apparatus and/or network entity.

FIG. 8 is a diagram 800 illustrating an example of a hardware implementation for an apparatus 804. The apparatus 804 may be a UE, a component of a UE, or may implement UE functionality. In some aspects, the apparatus 804 may include a cellular baseband processor 824 (also referred to as a modem) coupled to one or more transceivers 822 (e.g., cellular RF transceiver). The cellular baseband processor 824 may include on-chip memory 824'. In some aspects, the apparatus 804 may further include one or more subscriber identity modules (SIM) cards 820 and an application processor 806 coupled to a secure digital (SD) card 808 and a screen 810. The application processor 806 may include on-chip memory 806'. In some aspects, the apparatus 804 may further include a Bluetooth module 812, a WLAN module 814, an SPS module 816 (e.g., GNSS module), one or more sensor modules 818 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 826, a power supply 830, and/or a camera 832. The Bluetooth module 812, the WLAN module 814, and the SPS module 816 may include an on-chip transceiver (TRX) (or in some cases, just a receiver (RX)). The Bluetooth module 812, the WLAN module 814, and the SPS module 816 may include their own dedicated antennas and/or utilize the antennas 880 for communication. The cellular baseband processor 824 communicates through the transceiver(s) 822 via one or more antennas 880 with the UE 104 and/or with an RU associated with a network entity 802. The cellular baseband processor 824 and the application processor 806 may each include a computer-readable medium/memory 824', 806', respectively. The additional memory modules 826 may also be considered a computer-readable medium/memory. Each computer-readable medium/memory 824', 806', 826 may be non-transitory. The cellular baseband processor 824 and the application processor 806 are each responsible for general processing, including the execution of software stored on the computer-readable medium/memory. The software, when executed by the cellular baseband processor 824/application processor 806, causes the cellular baseband processor 824/application processor 806 to perform the various functions described supra. The computer-readable medium/memory may also be used for storing data that is manipulated by the cellular baseband processor 824/application processor 806 when executing software. The cellular baseband processor 824/application processor 806 may be a component of the UE 350 and may include the memory 360 and/or at least one of the TX processor 368, the RX processor 356, and the controller/processor 359. In one configuration, the apparatus 804 may be a processor chip (modem and/or application) and include just the cellular baseband processor 824 and/or the application processor 806, and in another configuration, the apparatus 804 may be the entire UE (e.g., see 350 of FIG. 3) and include the additional modules of the apparatus 804.

As discussed supra, the component 198 is configured to transmit, to a network entity, a SIC capability indication comprising an indication that the UE supports a SIC operation and an order of processing a first codeword and a second codeword; monitor for an ACK to enable the SIC operation between the UE and the network entity; and receive downlink communication based on the SIC operation in response to receiving the ACK to enable the SIC operation. The component 198 may be within the cellular baseband processor 824, the application processor 806, or both the cellular baseband processor 824 and the application processor 806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 804 may include a variety of components configured for various functions. In one configuration, the apparatus 804, and in particular the cellular baseband processor 824 and/or the application processor 806, includes means for transmitting, to a network entity, a SIC capability indication comprising an indication that the UE supports a SIC operation and an order of processing a first codeword and a second codeword. The apparatus includes means for monitoring for an ACK to enable the SIC operation between the UE and the network entity. The apparatus includes means for receiving downlink communication based on the SIC operation in response to receiving the ACK to enable the SIC operation. The apparatus further includes means for processing the first codeword, within the downlink communication, transmitted based on a first MCS. The apparatus further includes means for cancelling interference from the downlink communication based on the first codeword to obtain the second codeword, within the downlink communication, transmitted based on a second MCS. The means may be the component 198 of the apparatus 804 configured to perform the functions recited by the means. As described supra, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 9:
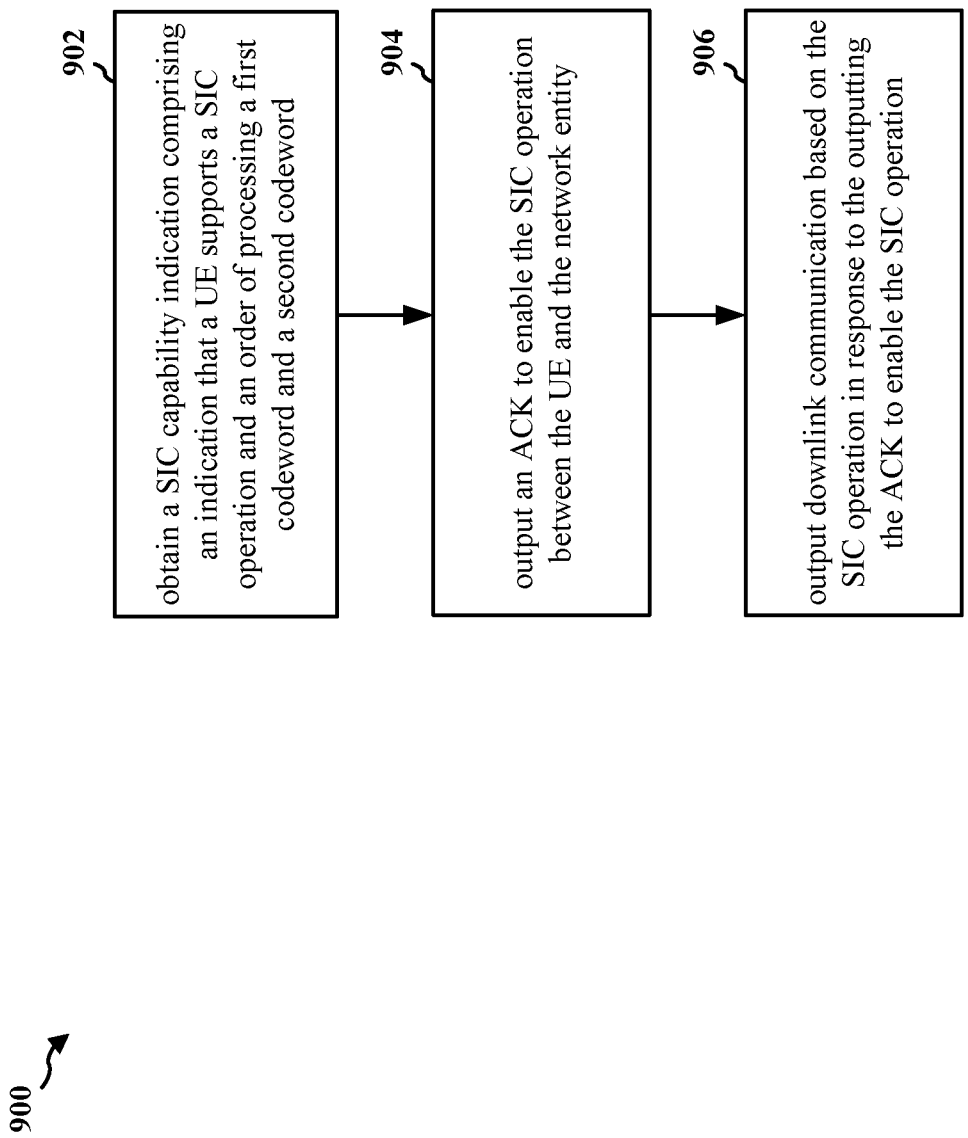
FIG. 9 is a flowchart of a method of wireless communication.

FIG. 9 is a flowchart 900 of a method of wireless communication. The method may be performed by a base station (e.g., the base station 102; the network entity 1102). One or more of the illustrated operations may be omitted, transposed, or contemporaneous. The method may allow for enhanced SIC operation between a base station and a UE.

At 902, the network entity may obtain a SIC capability indication. For example, 902 may be performed by SIC component 199 of network entity 1102. The network entity may obtain the SIC capability indication from a UE. The SIC capability indication may comprise an indication that the UE supports a SIC operation for 2-CW allocation and an order of processing a first codeword and a second codeword. In some aspects, the SIC capability indication is comprised within PUCCH, PUSCH, or RRC signaling.

At 904, the network entity may output an ACK to enable the SIC operation. For example, 904 may be performed by SIC component 199 of network entity 1102. The network entity may output the ACK to the UE to enable the SIC operation. The SIC operation may be between the UE and the network entity. In some aspects, the SIC operation is not enabled in response to receiving a NACK. In some aspects, the SIC operation is not enabled in response to failing to receive an ACK or a NACK in response to the transmitting of the SIC capability indication.

At 906, the network entity may output downlink communication based on the SIC operation. For example, 906 may be performed by SIC component 199 of network entity 1102. The network entity may output the downlink communication based on the SIC operation to the UE. The network entity may output the downlink communication based on the SIC operation in response to outputting the ACK to enable the SIC operation.

Figure 10:
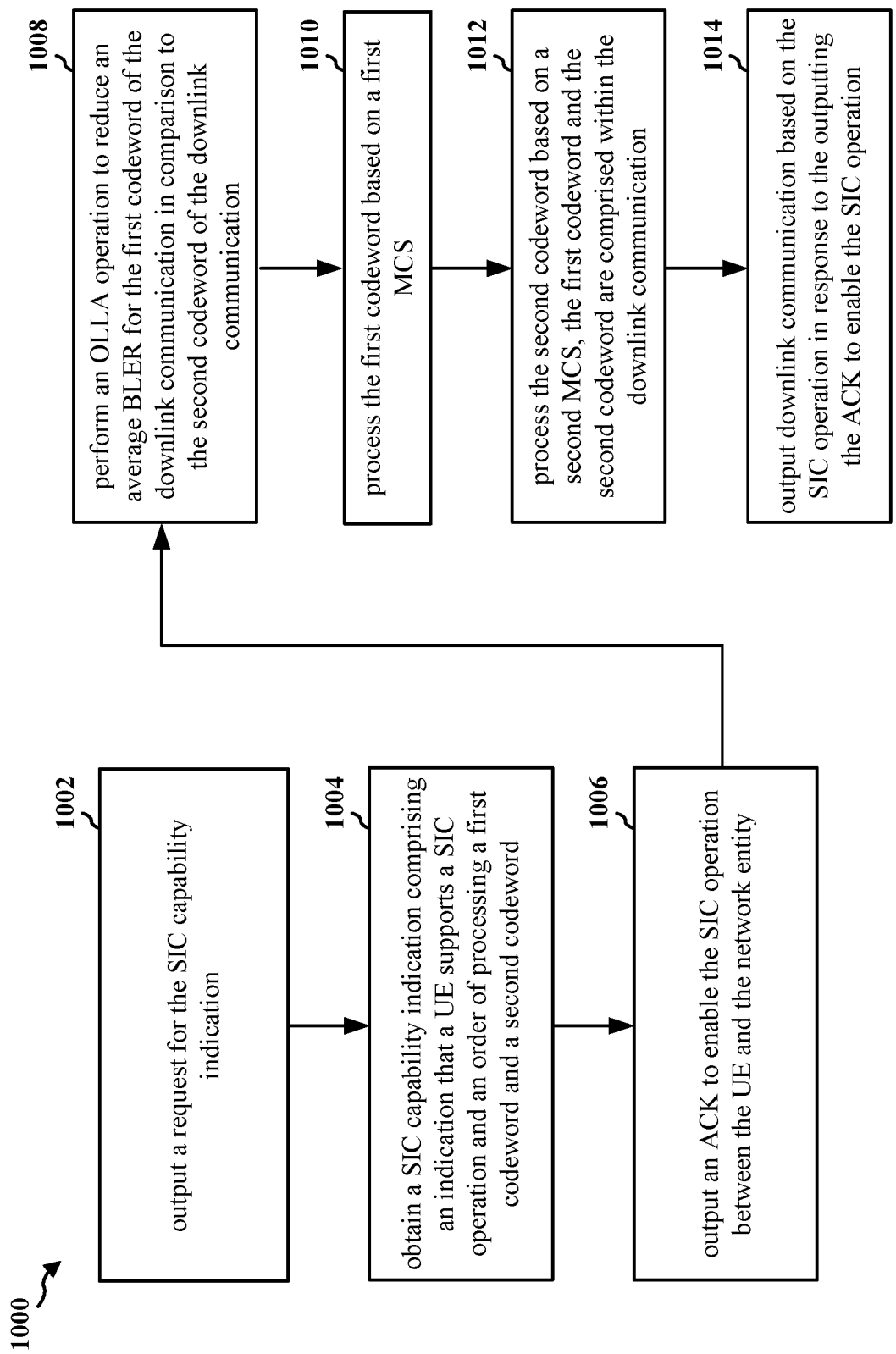
FIG. 10 is a flowchart of a method of wireless communication.

FIG. 10 is a flowchart 1000 of a method of wireless communication. The method may be performed by a base station (e.g., the base station 102; the network entity 1102. One or more of the illustrated operations may be omitted, transposed, or contemporaneous. The method may allow for enhanced SIC operation between a base station and a UE.

At 1002, the network entity may output a request for the SIC capability indication. For example, 1002 may be performed by SIC component 199 of network entity 1102. The network entity may output a request for the SIC capability indication to a UE.

At 1004, the network entity may obtain a SIC capability indication. For example, 1004 may be performed by SIC component 199 of network entity 1102. The network entity may obtain the SIC capability indication from a UE. The SIC capability indication may comprise an indication that the UE supports a SIC operation for 2-CW allocation and an order of processing a first codeword and a second codeword. In some aspects, the SIC capability indication is comprised within PUCCH, PUSCH, or RRC signaling.

At 1006, the network entity may output an ACK to enable the SIC operation. For example, 1006 may be performed by SIC component 199 of network entity 1102. The network entity may output the ACK to the UE to enable the SIC operation. The SIC operation may be between the UE and the network entity. In some aspects, the SIC operation is not enabled in response to receiving a NACK. In some aspects, the SIC operation is not enabled in response to failing to receive an ACK or a NACK in response to the transmitting of the SIC capability indication.

At 1008, the network entity may perform an OLLA operation. For example, 1008 may be performed by SIC component 199 of network entity 1102. The network entity may perform the OLLA operation to reduce an average BLER for the first codeword of the downlink communication in comparison to the second codeword of the downlink communication. In some aspects, reducing the average BLER for the first codeword may comprise at least one of lowering the MCS of the first codeword, decreasing an amount of transmitted parallel data streams of the first codeword, or adjusting a transmit beamforming or precoding for the downlink communication. In some aspects, one or more parameters of the OLLA operation may be adjusted such that the average BLER of the first codeword is less than the BLER of the second codeword.

At 1010, the network entity, to output the downlink communication based on the SIC operation, may process the first codeword. For example, 1010 may be performed by SIC component 199 of network entity 1102. The network entity may process the first codeword based on a first MCS.

At 1012, the network entity, to output the downlink communication based on the SIC operation, may process the second codeword. For example, 1012 may be performed by SIC component 199 of network entity 1102. The network entity may process the second codeword based on a second MCS. The first codeword and the second codeword are comprised within the downlink communication. In some aspects, the order of processing the first codeword and the second codeword may comprise that the first codeword is processed before the second codeword. In some aspects, the order of processing the first codeword and the second codeword may comprise that the second codeword is processed before the first codeword.

At 1014, the network entity may output downlink communication based on the SIC operation. For example, 1014 may be performed by SIC component 199 of network entity 1102. The network entity may output the downlink communication based on the SIC operation to the UE. The network entity may output the downlink communication based on the SIC operation in response to outputting the ACK to enable the SIC operation.

Figure 11:
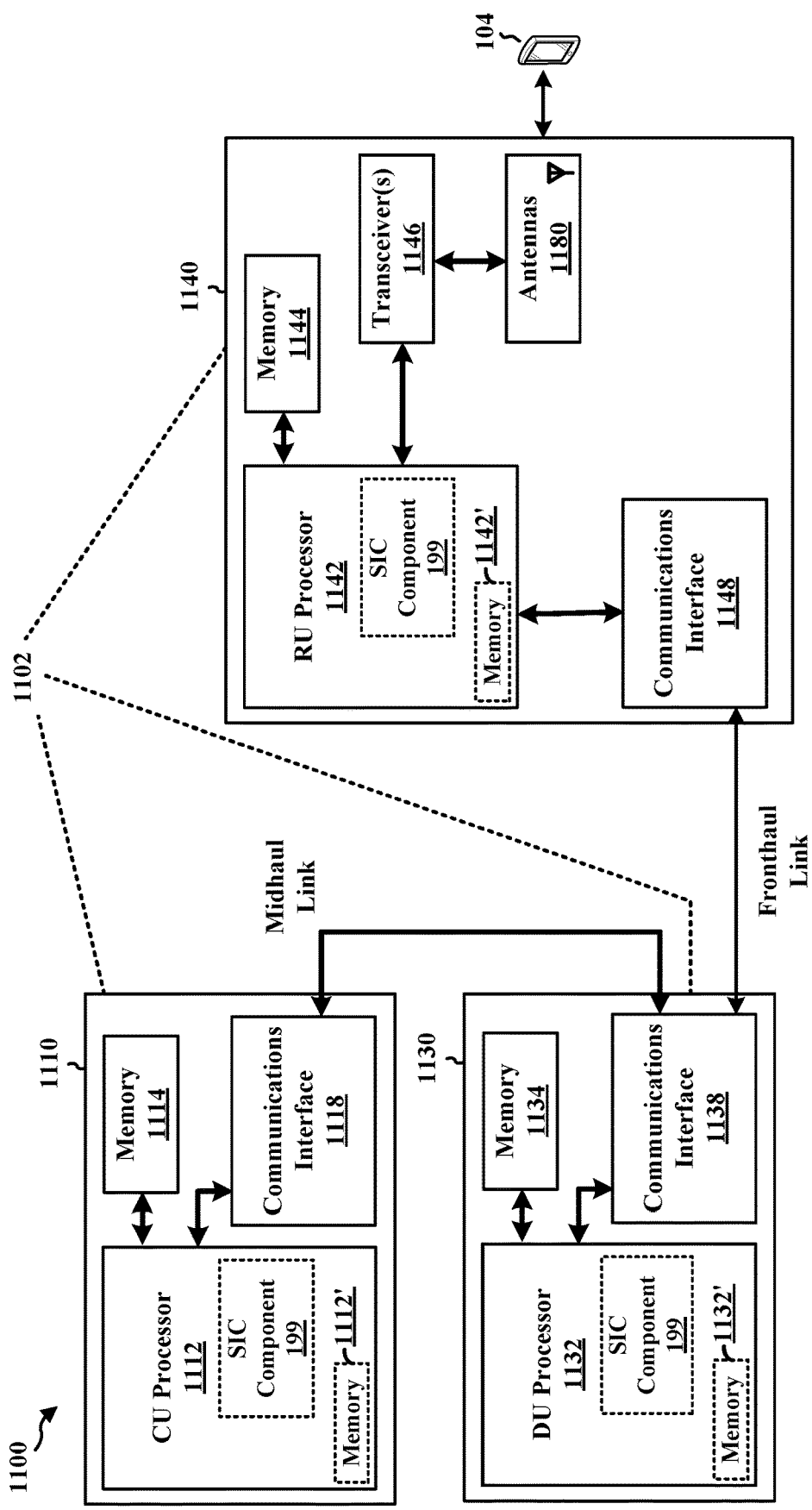
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to obtain a SIC capability indication comprising an indication that a UE supports a SIC operation and an order of processing a first codeword and a second codeword; output an ACK to enable the SIC operation between the UE and the network entity; and output downlink communication based on the SIC operation in response to the outputting the ACK to enable the SIC operation. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for obtaining a SIC capability indication comprising an indication that a UE supports a SIC operation and an order of processing a first codeword and a second codeword. The network entity includes means for outputting an ACK to enable the SIC operation between the UE and the network entity. The network entity includes means for outputting downlink communication based on the SIC operation in response to the outputting the ACK to enable the SIC operation. The network entity further includes means for outputting a request for the SIC capability indication. The network entity further includes means for processing the first codeword based on a first MCS. The network entity further includes means for processing the second codeword based on a second MCS. The first codeword and the second codeword are comprised within the downlink communication. The network entity further includes means for performing an OLLA operation to reduce an average BLER for the first codeword of the downlink communication in comparison to the second codeword of the downlink communication. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising transmitting, to a network entity, a SIC capability indication comprising an indication that the UE supports a SIC operation and an order of processing a first codeword and a second codeword; monitoring for an ACK to enable the SIC operation between the UE and the network entity; and receiving downlink communication based on the SIC operation in response to receiving the ACK to enable the SIC operation.

Aspect 2 is the method of aspect 1, further including receiving, from the network entity, a request to transmit the SIC capability indication.

Aspect 3 is the method of any of aspects 1 and 2, further includes that the SIC capability indication is comprised within a PUCCH, a PUSCH, or RRC signaling.

Aspect 4 is the method of any of aspects 1-3, further includes that the SIC operation is not enabled in response to receiving a NACK.

Aspect 5 is the method of any of aspects 1-4, further includes that the SIC operation is not enabled in response to failing to receive the ACK or a NACK in response to the transmitting of the SIC capability indication.

Aspect 6 is the method of any of aspects 1-5, further including processing the first codeword, within the downlink communication, transmitted based on a first MCS; and canceling interference from the downlink communication based on the first codeword to obtain the second codeword, within the downlink communication, transmitted based on a second MCS.

Aspect 7 is the method of any of aspects 1-6, further includes that the order of processing the first codeword and the second codeword comprises that the first codeword is processed before the second codeword.

Aspect 8 is the method of any of aspects 1-7, further includes that the order of processing the first codeword and the second codeword comprises that the second codeword is processed before the first codeword.

Aspect 9 is an apparatus for wireless communication at a UE including at least one processor coupled to a memory and at least one transceiver, the at least one processor configured to implement any of Aspects 1-8.

Aspect 10 is an apparatus for wireless communication at a UE including means for implementing any of Aspects 1-8.

Aspect 11 is a computer-readable medium storing computer executable code, where the code when executed by a processor causes the processor to implement any of Aspects 1-8.

Aspect 12 is a method of wireless communication at a network entity comprising obtaining a SIC capability indication comprising an indication that a UE supports a SIC operation and an order of processing a first codeword and a second codeword; outputting an ACK to enable the SIC operation between the UE and the network entity; and outputting downlink communication based on the SIC operation in response to the outputting the ACK to enable the SIC operation.

Aspect 13 is the method of aspect 12, further including outputting a request for the SIC capability indication.

Aspect 14 is the method of any of aspects 12 and 13, further includes that the SIC capability indication is comprised within a PUCCH, a PUSCH, or RRC signaling.

Aspect 15 is the method of any of aspects 12-14, further includes that the SIC operation is not enabled in response to the outputting of a NACK.

Aspect 16 is the method of any of aspects 12-15, further includes that the SIC operation is not enabled in response to failing to output the ACK or a NACK in response to the obtaining of the SIC capability indication.

Aspect 17 is the method of any of aspects 12-16, further including processing the first codeword based on a first MCS; and processing the second codeword based on a second MCS, wherein the first codeword and the second codeword are comprised within the downlink communication.

Aspect 18 is the method of any of aspects 12-17, further including performing an OLLA operation to reduce an average BLER for the first codeword of the downlink communication in comparison to the second codeword of the downlink communication.

Aspect 19 is the method of any of aspects 12-18, further includes that to reduce the average BLER for the first codeword comprises at least one of lowering the MCS of the first codeword, decreasing an amount of transmitted parallel data streams of the first codeword, or adjusting a transmit beamforming or precoding for the downlink communication.

Aspect 20 is the method of any of aspects 12-19, further includes that one or more parameters of the OLLA operation are adjusted such that the average BLER of the first codeword is less than the BLER of the second codeword.

Aspect 21 is the method of any of aspects 12-20, further includes that the order of processing the first codeword and the second codeword comprises that the first codeword is processed before the second codeword.

Aspect 22 is the method of any of aspects 12-21, further includes that the order of processing the first codeword and the second codeword comprises that the second codeword is processed before the first codeword.

Aspect 23 is an apparatus for wireless communication at a network entity including at least one processor coupled to a memory and at least one transceiver, the at least one processor configured to implement any of Aspects 12-22.

Aspect 24 is an apparatus for wireless communication at a network entity including means for implementing any of Aspects 12-22.

Aspect 25 is a computer-readable medium storing computer executable code, where the code when executed by a processor causes the processor to implement any of Aspects 12-22.

What is claimed is:

1. An apparatus for wireless communication at a user equipment (UE), comprising:
   a memory; and
   at least one processor coupled to the memory and, based at least in part on information stored in the memory, the at least one processor is configured to:
      transmit, to a network entity, a successive interference cancellation (SIC) capability indication comprising an indication that the UE supports a SIC operation and an order of processing a first codeword and a second codeword;
      monitor for an acknowledgement (ACK) to enable the SIC operation between the UE and the network entity; and
      receive downlink communication based on the SIC operation in response to receiving the ACK to enable the SIC operation, wherein to receive the downlink communication based on the SIC operation, the at least one processor is further configured to:
         process the first codeword, within the downlink communication, transmitted based on a first modulation and coding scheme (MCS); and
         cancel interference from the downlink communication based on the first codeword to obtain the second codeword, within the downlink communication, transmitted based on a second MCS.

2. The apparatus of claim 1, further comprising a transceiver coupled to the at least one processor.

3. The apparatus of claim 1, wherein the at least one processor is further configured to: receive, from the network entity, a request to transmit the SIC capability indication.

4. The apparatus of claim 1, wherein the SIC capability indication is comprised within a physical uplink control channel (PUCCH), a physical uplink shared channel (PUSCH), or radio resource control (RRC) signaling.

5. The apparatus of claim 1, wherein the SIC operation is not enabled in response to receiving a non-acknowledgement (NACK).

6. The apparatus of claim 1, wherein the SIC operation is not enabled in response to failing to receive the ACK or a non-acknowledgement (NACK) in response to the transmitting of the SIC capability indication.

7. The apparatus of claim 1, wherein the order of processing the first codeword and the second codeword comprises that the first codeword is processed before the second codeword.

8. The apparatus of claim 1, wherein the order of processing the first codeword and the second codeword comprises that the second codeword is processed before the first codeword.

9. A method of wireless communication at a user equipment (UE), comprising:
   transmitting, to a network entity, a successive interference cancellation (SIC) capability indication comprising an indication that the UE supports a SIC operation and an order of processing a first codeword and a second codeword;

monitoring for an acknowledgement (ACK) to enable the SIC operation between the UE and the network entity; and receiving downlink communication based on the SIC operation in response to receiving the ACK to enable the SIC operation, wherein the receiving the downlink communication based on the SIC operation further comprises:

processing the first codeword, within the downlink communication, transmitted based on a first modulation and coding scheme (MCS); and canceling interference from the downlink communication based on the first codeword to obtain the second codeword, within the downlink communication, transmitted based on a second MCS.

10. The method of claim 9, further comprising:
receiving, from the network entity, a request to transmit the SIC capability indication.

11. The method of claim 9, wherein the SIC capability indication is comprised within a physical uplink control channel (PUCCH), a physical uplink shared channel (PUSCH), or radio resource control (RRC) signaling.

12. The method of claim 9, wherein the SIC operation is not enabled in response to receiving a non-acknowledgement (NACK).

13. An apparatus for wireless communication at a network entity, comprising:
a memory; and
at least one processor coupled to the memory and, based at least in part on information stored in the memory, the at least one processor is configured to:
obtain a successive interference cancellation (SIC) capability indication comprising an indication that a user equipment (UE) supports a SIC operation and an order of processing a first codeword and a second codeword;
output an acknowledgement (ACK) to enable the SIC operation between the UE and the network entity; and
output downlink communication based on the SIC operation in response to the outputting the ACK to enable the SIC operation, wherein to output the downlink communication based on the SIC operation, the at least one processor is further configured to:
process the first codeword based on a first modulation and coding scheme (MCS); and
process the second codeword based on a second MCS, wherein the first codeword and the second codeword are comprised within the downlink communication.

14. The apparatus of claim 13, further comprising a transceiver coupled to the at least one processor.

15. The apparatus of claim 13, wherein the at least one processor is further configured to:
output a request for the SIC capability indication.

16. The apparatus of claim 13, wherein the SIC capability indication is comprised within a physical uplink control channel (PUCCH), a physical uplink shared channel (PUSCH), or radio resource control (RRC) signaling.

17. The apparatus of claim 13, wherein the SIC operation is not enabled in response to the outputting of a non-acknowledgement (NACK).

18. The apparatus of claim 13, wherein the SIC operation is not enabled in response to failing to output the ACK or a non-acknowledgement (NACK) in response to the obtaining of the SIC capability indication.

19. The apparatus of claim 15, wherein the at least one processor is further configured to:
perform an outer-loop link adaptation (OLLA) operation to reduce an average block-error rate (BLER) for the first codeword of the downlink communication in comparison to the second codeword of the downlink communication.

20. The apparatus of claim 19, wherein to reduce the average BLER for the first codeword comprises at least one of lowering the MCS of the first codeword, decreasing an amount of transmitted parallel data streams of the first codeword, or adjusting a transmit beamforming or precoding for the downlink communication.

21. The apparatus of claim 19, wherein one or more parameters of the OLLA operation are adjusted such that the average block-error rate (BLER) of the first codeword is less than the BLER of the second codeword.

22. The apparatus of claim 13, wherein the order of processing the first codeword and the second codeword comprises that the first codeword is processed before the second codeword.

23. The apparatus of claim 13, wherein the order of processing the first codeword and the second codeword comprises that the second codeword is processed before the first codeword.

24. A method of wireless communication at a network entity, comprising:
obtaining a successive interference cancellation (SIC) capability indication comprising an indication that a user equipment (UE) supports a SIC operation and an order of processing a first codeword and a second codeword;
outputting an acknowledgement (ACK) to enable the SIC operation between the UE and the network entity; and
outputting downlink communication based on the SIC operation in response to the outputting the ACK to enable the SIC operation, wherein the outputting the downlink communication based on the SIC operation further comprises:
processing the first codeword based on a first modulation and coding scheme (MCS); and
processing the second codeword based on a second MCS, wherein the first codeword and the second codeword are comprised within the downlink communication.

25. The method of claim 24, further comprising:
outputting a request for the SIC capability indication.

26. The method of claim 24, further comprising:
performing an outer-loop link adaptation (OLLA) operation to reduce an average block-error rate (BLER) for the first codeword of the downlink communication in comparison to the second codeword of the downlink communication.

* * * * *